(12) United States Patent
Hasholt

(10) Patent No.: US 11,794,862 B2
(45) Date of Patent: Oct. 24, 2023

(54) MONOPILE FASTENING DEVICE

(71) Applicant: OSK-ShipTech A/S, København Ø (DK)

(72) Inventor: Steen T. Hasholt, Allerod (DK)

(73) Assignee: OSK-ShipTech A/S, København Ø (DK)

( * ) Notice: Subject to any disclaimer, the term of this patent is extended or adjusted under 35 U.S.C. 154(b) by 0 days.

(21) Appl. No.: 18/002,171

(22) PCT Filed: Jun. 18, 2021

(86) PCT No.: PCT/EP2021/066589
§ 371 (c)(1),
(2) Date: Dec. 16, 2022

(87) PCT Pub. No.: WO2021/259780
PCT Pub. Date: Dec. 30, 2021

(65) Prior Publication Data
US 2023/0182871 A1    Jun. 15, 2023

(30) Foreign Application Priority Data
Jun. 26, 2020    (EP) ..................................... 20182562

(51) Int. Cl.
*B60P 7/08*    (2006.01)
*B63B 35/00*    (2020.01)
(Continued)

(52) U.S. Cl.
CPC .............. *B63B 35/003* (2013.01); *B60P 3/40* (2013.01); *B60P 7/0892* (2013.01); *B60P 7/12* (2013.01); *B63B 25/24* (2013.01); *B63B 25/28* (2013.01)

(58) Field of Classification Search
CPC .. B60P 7/0892; B60P 7/12; B60P 3/40; B60P 3/41; B63B 35/003; B63B 25/24; B63B 25/28
(Continued)

(56) References Cited

U.S. PATENT DOCUMENTS 3,387,813 A    6/1968 Carino
3,392,682 A *  7/1968 Francis ................ B61D 45/003
                                                    410/49
(Continued)

FOREIGN PATENT DOCUMENTS

EP    3109531 A1    12/2016
EP    3575199 A1    12/2019
(Continued)

OTHER PUBLICATIONS

European Patent Office, European Search Report and Opinion issued in corresponding application EP 20182562.7 dated Dec. 22, 2020 (11 pages).
(Continued)

*Primary Examiner* — Stephen T Gordon
(74) *Attorney, Agent, or Firm* — J. Peter Paredes; Amin Talati Wasserman LLP

(57) ABSTRACT

A monopile fastening system (1, 9, 17) for retaining one or more elongated monopile during sea transport and/or quay transport, the system comprising: —at least two supporting devices (3, 11, 18); —a supporting frame (2, 10, 23) for securing the at least two supporting devices to a surface of a vessel, barge or a sea transport unit, the at least two supporting devices having each at least one surface (6, 32) in contact with a surface (7, 33) of the supporting frame; wherein each of the at least two supporting devices comprises, at least two supporting elements (4, 5, 12, 13, 20, 24, 27), the supporting elements having each at least one surface
(Continued)

(14, 15, 25, 26, 28, 29) in contact with each other; wherein the at least two supporting elements are connected with each other through one or more displacing means (16, 22, 30); and wherein the one or more displacing means are means for displacing the at least two supporting elements along the at least one surface in contact with each other.

11 Claims, 5 Drawing Sheets

(51) Int. Cl.
    *B63B 25/24*     (2006.01)
    *B63B 25/28*     (2006.01)
    *B60P 3/40*     (2006.01)
    *B60P 7/12*     (2006.01)

(58) Field of Classification Search
    USPC ....... 410/36–37, 42, 47, 49–50, 30, 94, 121, 410/44
    See application file for complete search history.

(56) References Cited

U.S. PATENT DOCUMENTS

| | | | | |
|---|---|---|---|---|
| 5,425,608 | A | * | 6/1995 | Reitnouer ................. B60P 7/12 410/49 |
| 2011/0274511 | A1 | * | 11/2011 | Ferrari ..................... B60P 7/12 410/49 |
| 2013/0142585 | A1 | * | 6/2013 | Yogodzinski ............. B60P 3/40 410/44 |

FOREIGN PATENT DOCUMENTS

| | | |
|---|---|---|
| KR | 101980903 B1 | 5/2019 |
| SE | 419726 B | 8/1981 |

OTHER PUBLICATIONS

International Searching Authority/EPO, International Search Report and Written Opinion issued in corresponding application PCT/EP2021/066589 dated Oct. 20, 2021 (14 pages).

* cited by examiner

MONOPILE FASTENING DEVICE

FIELD OF THE INVENTION

The present invention relates to a monopile fastening system for retaining one or more elongated monopile during sea transport and/or quay transport.

The present invention also relates to a monopile fastening structure comprising a plurality of monopile fastening systems and relates to a vessel, a barge or a sea transport unit comprising a monopile fastening structure or a monopile fastening system.

The invention also relates to a method for fastening a monopile using a monopile fastening system.

BACKGROUND OF THE INVENTION

Monopile fastening systems are devices for retaining elongated monopiles, such as a monopile for supporting a wind turbine on a seabed.

Monopile fastening systems generally comprise rigid support elements having a support surface on which the monopile is retained during transport.

The shape of the support surface is generally curved so as to accommodate the monopiles.

Monopile fastening systems have indeed support surfaces with a radius that approximately equals the radius of the monopile at the specific support position. This allows for perfect fitting and retaining of the monopile during transport.

However, current fastening systems have the drawback that each system is specifically designed to achieve optimal retainment of a specific size and shape of monopiles, thus limiting the flexibility of use as well as the versatility of the systems.

Typically, fastening systems are fixed, such as welded, to the deck of a vessel and once the specific monopile has been transported and dropped off, these monopile fastening systems cannot be re-used to transport monopiles having different sizes. In that, current fastening systems are then freed from the deck as they can be generally used only once during transport of a specific monopile, or a series of monopiles having a specific size. These issues make the cost of transport of monopiles very high.

Hence, an improved monopile fastening system, would be advantageous, and in particular a more flexible and reliable monopile fastening system which can be used to accommodate monopiles having different size and shape would be advantageous.

OBJECT OF THE INVENTION

An objective of the present invention is therefore to provide a monopile fastening system, a monopile fastening structure, a vessel, a barge or a sea transport unit comprising a monopile fastening structure or a monopile fastening system with an improved flexibility with respect to the re-usability of the device.

An object of the present invention is also to provide a method for fastening a monopile using a monopile fastening system.

An object of the present invention may also be seen as the provision of an efficient monopile fastening system to support and retain monopiles during sea and/or quay transportation.

A further object of the present invention is to provide a monopile fastening system that can be used to accommodate monopiles having different sizes.

Another object of the present invention is to provide a method for fastening a monopile using a monopile fastening system, which can be used to accommodate monopiles having different sizes.

An even further object of the invention may also be seen as to provide an alternative to the prior art.

In particular, it may be seen as an object of the present invention to provide an efficient monopile fastening system with an improved flexibility, which can be used to accommodate monopiles having different sizes by the combination of complementary supporting elements that can be singularly activated.

SUMMARY OF THE INVENTION

Thus, the above described object and several other objects are intended to be obtained in a first aspect of the invention by a monopile fastening system for retaining one or more elongated monopile during sea transport and/or quay transport, wherein the system comprises: a supporting frame for securing or fixing at least two supporting devices to a surface of a vessel, barge or a sea transport unit; wherein the at least two supporting devices have each at least one surface in contact with a surface of the supporting frame.

Each of the at least two supporting devices comprises at least two supporting elements having each at least one surface in contact with each other.

The monopile fastening system is a system having the function of supporting and retaining monopiles, i.e. fixing in position monopiles during transport to avoid potential undesired movements.

The supporting frame is a base frame suitable for carrying the weight of a monopile and for transferring its weight to the surface of a vessel, a barge or a sea transport unit.

The supporting frame is fixed, such as welded, to the deck of the vessel.

In some embodiments, the supporting frame may comprise surfaces inclined in respect to the surface of the deck.

A further function of the supporting frame is to secure the at least two supporting devices to a surface of a vessel. This is achieved by connecting the least two supporting devices to a surface of the supporting frame.

In some embodiments, this surface, which is in contact with at least one surface of each of the at least two supporting devices, is the top surface of the supporting frame.

The supporting frame may comprise also leveling elements for leveling or shimming each of the at least two supporting devices separately.

In some embodiments, the at least two supporting devices are connected to the surface of the supporting frame through one or more shifting means.

In some further embodiments, the one or more shifting means are means for shifting the at least two supporting devices along the at least one surface in contact with the surface of the supporting frame.

When in use, upon action of the shifting means, the at least two supporting devices move along the surfaces in contact with the supporting frame.

The means for shifting allows for a movement in a horizontal direction along the contact surfaces, so that, when in use, the two contact surfaces will be sliding away from each other or towards each other still keeping the surfaces in contact with each other.

The at least two supporting devices comprise each at least two supporting elements that, when in use, allow for supporting and retaining monopiles.

In some other embodiments, the at least two supporting elements are connected with each other through one or more displacing means.

In some embodiments, the one or more displacing means are means for displacing the at least two supporting elements along the at least one surface in contact with each other.

In some further embodiments, the at least one surface of the at least two supporting devices in contact with the surface of the supporting frame is the bottom surface of the bottom supporting element of the at least two supporting elements.

Thus, in some embodiments, at least one of the at least two supporting elements is connected to a surface, such as the top surface, of the supporting frame through the one or more displacing means and has at least one surface in contact with a surface, such as the top surface of the supporting frame.

The at least two supporting devices may be at least two wedge supporting devices.

The wedge supporting device may comprise several wedge supporting elements.

The at least two supporting elements may be at least two wedge supporting elements.

The wedge element is defined as a triangular shaped solid body having at least one surface having an inclination, i.e. turning away from vertical or horizontal, in respect to the surface of the deck or the surface of the supporting frame.

The wedge supporting elements may thus be considered as moveable wedges that can be displaced along the at least one surface in contact with each other or along the at least one surface in contact with the surface of the supporting frame so as to accommodate monopiles with sections having different diameters.

Following sea transport of monopiles having a specific size, the fastening system may be easily adapted to the transport of monopiles having different sizes by moving the wedge supporting elements through the displacing and shifting means so as the top surface of the wedge supporting elements create an optimal tangent line at the monopiles surface.

The inclination of the wedge supporting elements, i.e. the inclination of the top surface of the wedge supporting elements may vary depending on the type of monopiles that need to fasten and transported.

For example, the angle of the top surface of each wedge supporting elements may be between 10° and 30° degrees, such as 20°, creating an optimal tangent line at the monopile surface.

The at least two supporting elements may comprises one or more pads.

The supporting frame may also comprises one or more pads.

The one or more pads are contact pads provided with a friction surface for providing frictional contact with the monopole. This ensures that the monopile is fasten thus supported and retained during transport.

The use of pads has the advantage of improving frictional contact between the monopile and the supporting elements.

The presence of a plurality of pads on each supporting element may be advantageous as replacement of pads may occur separately, thereby decreasing the maintenance requirements of the monopile fastening system.

Pads such as contact pads or supporting pads may also be present on the supporting frame ensuring frictional contact between the monopile and the supporting frame.

The one or more shifting means connecting the supporting frame to at least one of the at least two supporting devices comprise at least one hydraulic jack.

The one or more displacing means connecting the at least two supporting elements may be or may comprise at least one hydraulic jack.

The at least one hydraulic jack is configured such that it may displace supporting elements having contact surfaces in a first direction towards each other or in a second opposite direction outward from each other, along their contact surfaces.

The hydraulic jacks may be located in several different positions on the supporting elements or on the supporting frame.

For example, at least one hydraulic jack may be located at the side or at the edge of the supporting elements or of the supporting frame.

In some embodiments, the at least one hydraulic jack is positioned in a recess of the contact surfaces of the at least two supporting elements.

In some other embodiments, the at least one hydraulic jack is positioned in a recess of the supporting frame.

The recess of the supporting frame may be located onto a surface of the supporting frame, such as the top surface of the supporting frame, i.e. the surface in contact with the bottom surface of one of the at least two supporting elements.

The top surface of the supporting frame is the surface opposite to the surface on which the supporting frame rest, which is the one fasten to a surface of a vessel, barge or a sea transport unit.

In some other embodiments, the one or more displacing means connecting the at least two supporting elements may be or may comprise a threaded bar configured such that, upon rotation in a first direction, supporting elements in contact with each other are drawn towards each other along their contact surfaces, while rotation in a second opposite direction allows for supporting elements in contact with each other to be moved outward from each other also along their contact surfaces.

According to a second aspect, the invention relates to a monopile fastening structure comprising a plurality of monopile fastening systems according to the first aspect of the invention.

According to a third aspect, the invention relates to a vessel, a barge or a sea transport unit comprising a monopile fastening system according to the first aspect of the invention or to a monopile fastening structure according to the second aspect of the invention.

According to a further aspect, the invention relates to a method for fastening a monopile using a monopile fastening system according to the first aspect of the present invention.

The first, second, third and other aspects and embodiments of the present invention may each be combined with any of the other aspects and embodiments. These and other aspects of the invention will be apparent from and elucidated with reference to the embodiments described hereinafter.

BRIEF DESCRIPTION OF THE FIGURES

The monopile fastening system for retaining one or more elongated monopile during transport, a monopile fastening structure, a vessel, a barge or a sea transport unit comprising a monopile fastening structure or monopile fastening system according to the invention will now be described in more details with regard to the accompanying figures. The figures show one way of implementing the present invention and are not to be construed as being limiting to other possible embodiments falling within the scope of the attached claim set.

DETAILED DESCRIPTION OF AN EMBODIMENT

Figure 1:
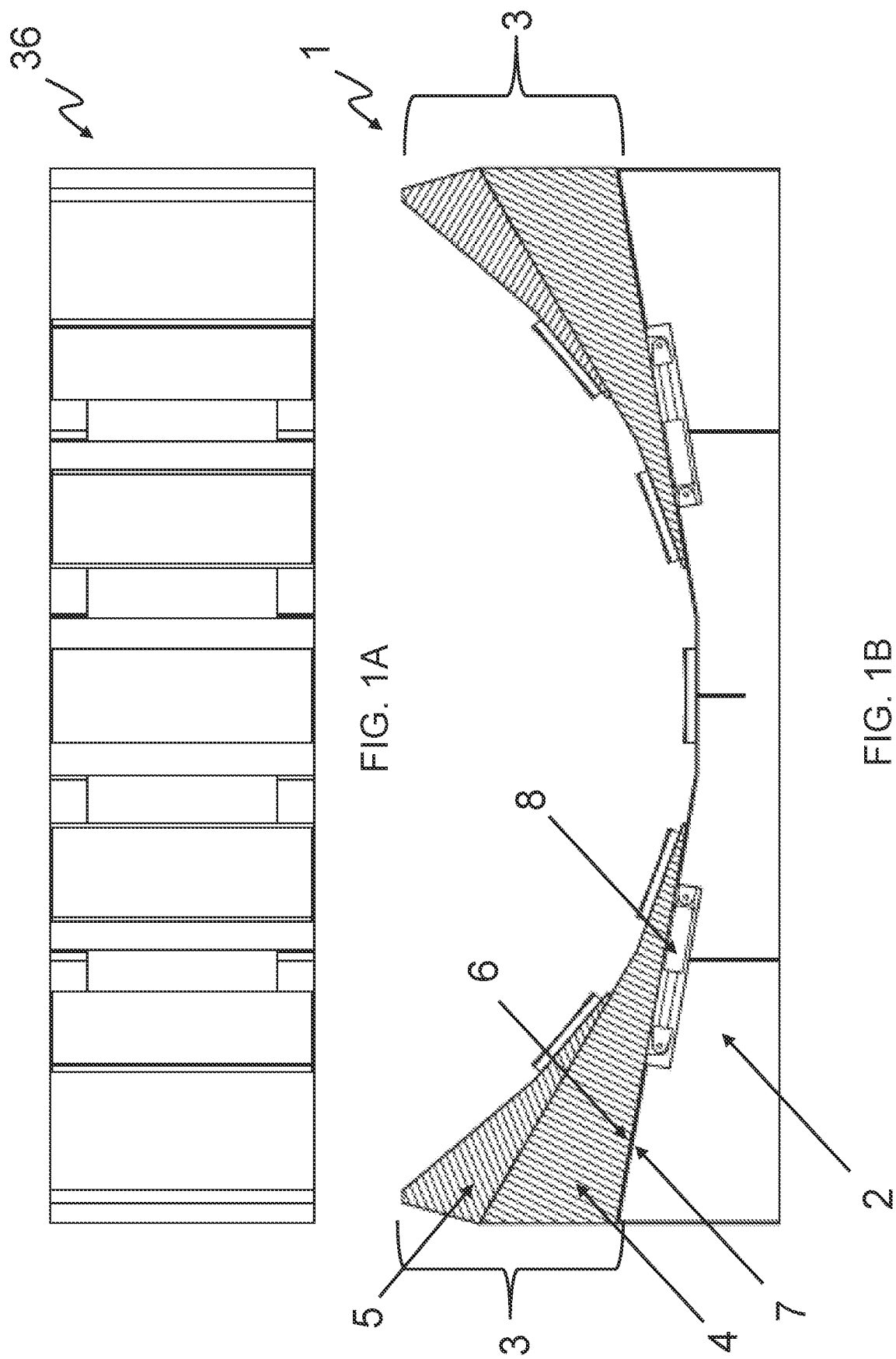
FIGS. 1A and 1B show a top view and a cross section of the monopile fastening system according to some embodiments of the invention comprising shifting means between the at least two supporting devices and the supporting frame.

FIG. 1A shows a top view 36 of the monopile fastening system according to some embodiments of the invention.

FIG. 1B shows a cross section 1 of the monopile fastening system of FIG. 1A comprising hydraulic jacks 8 located into recesses of the supporting frame 2. The two supporting devices 3 comprise each two wedge supporting elements 4 and 5. When in use, the two supporting devices 3 can slide along the contacting surfaces 6 and 7 upon activation of the hydraulic jacks 8 so as to accommodate monopiles having different section diameter.

Figure 2:
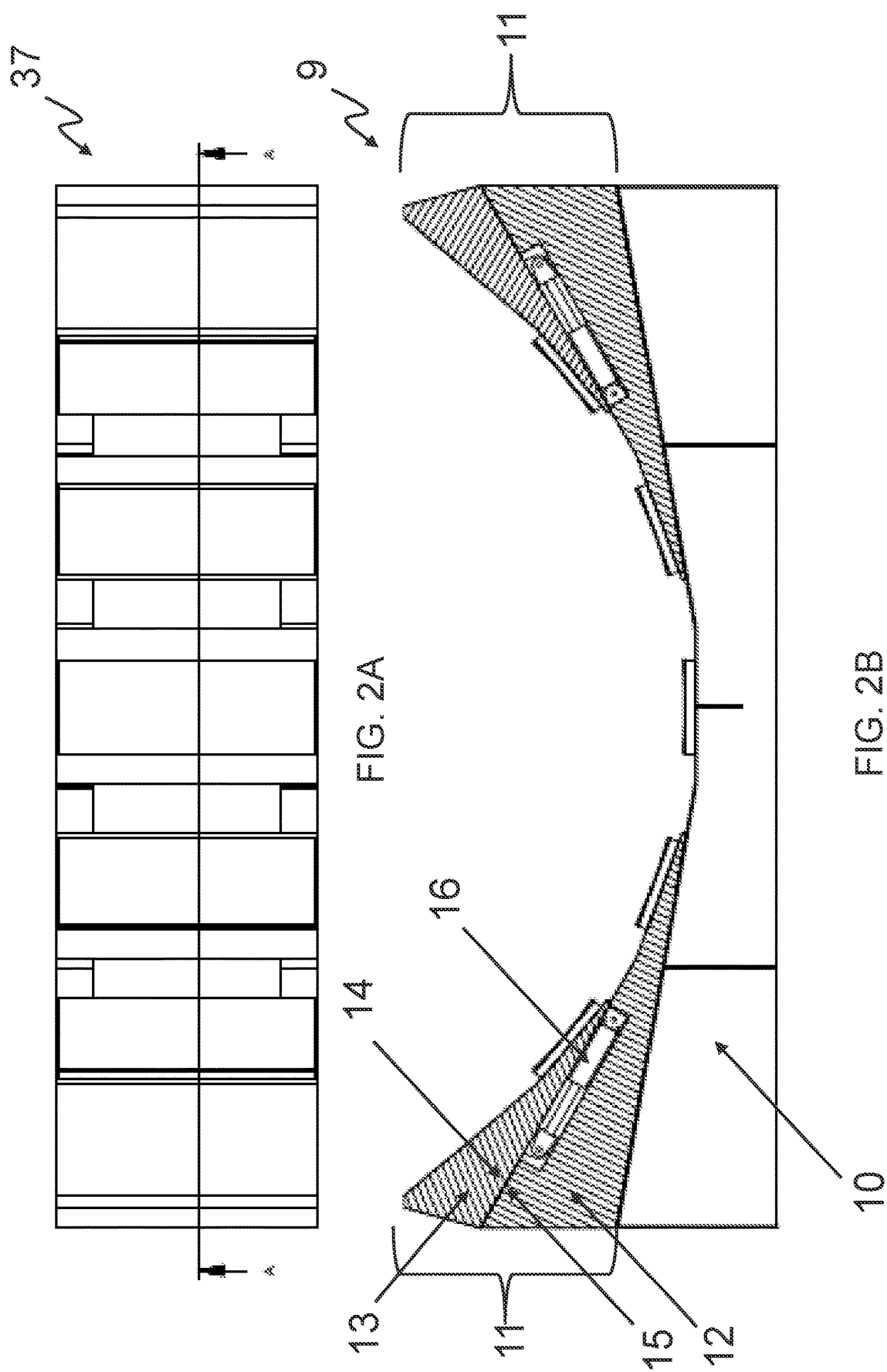
FIGS. 2A and 2B show a top view and a cross section of the monopile fastening system according to some embodiments of the invention comprising displacing means between the at least two supporting elements.

FIG. 2A shows a top view 37 of the monopile fastening system according to some other embodiments of the invention.

FIG. 2B shows a cross section 9 of the monopile fastening system of FIG. 2A comprising supporting devices 11 fixed onto supporting frame 10.

Each of the supporting devices 11 comprises wedge supporting elements 12 and 13. Two hydraulic jacks 16 are located into recesses of the bottom supporting elements 12 connecting wedge supporting elements 12 to the top supporting elements 13.

When in use, the two wedge supporting elements 12 and 13 can be displaced along the contacting surfaces 15 and 14 upon activation of the hydraulic jacks 16 so as to accommodate monopiles having different section diameter.

Figure 3:
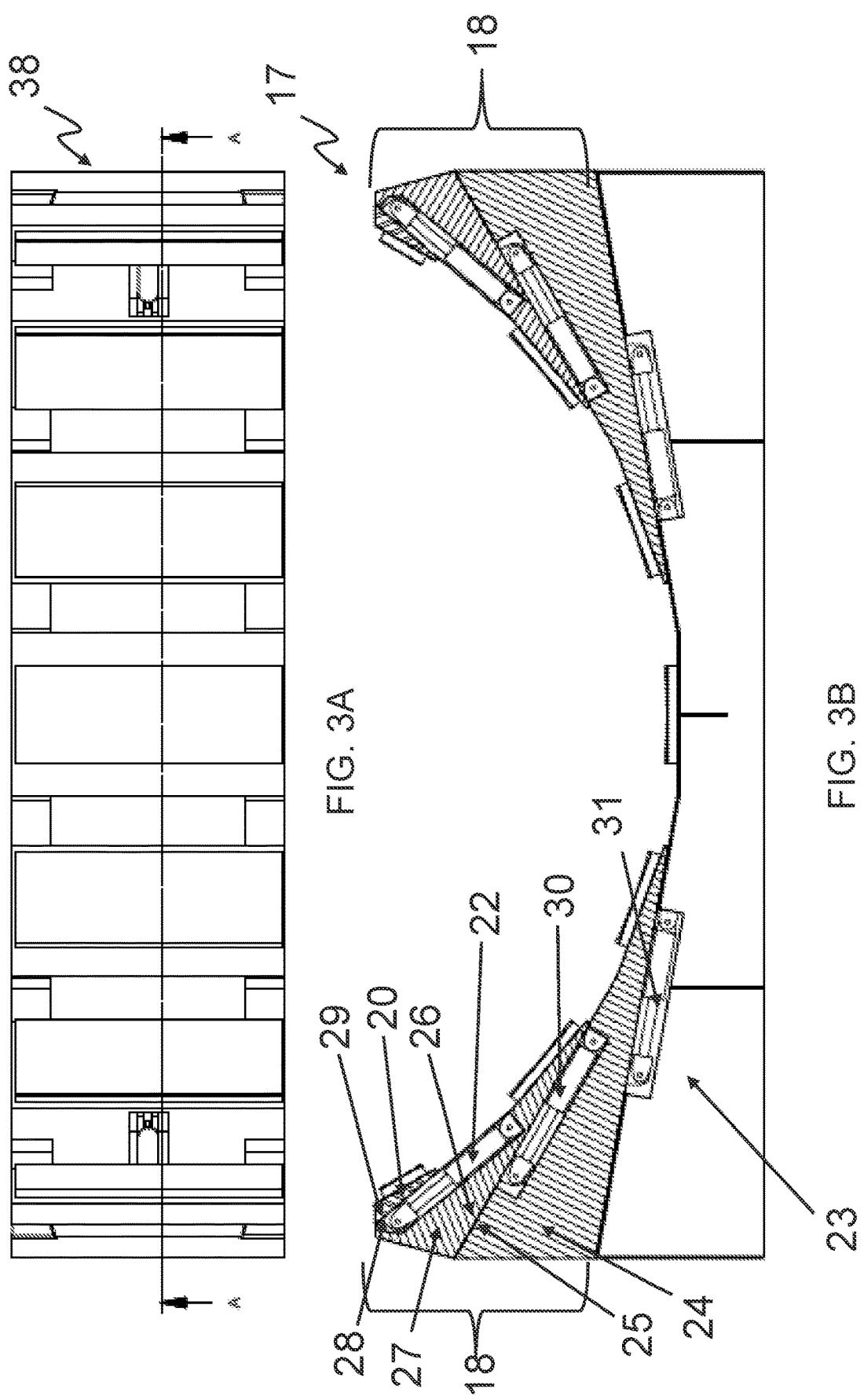
FIGS. 3A and 3B show a top view and a cross section of the monopile fastening system according to some embodiments of the invention comprising both displacing means between the at least two supporting elements and shifting means between the at least two supporting devices and the supporting frame.

FIG. 3A shows a top view 38 of the monopile fastening system according to some embodiments of the invention comprising three supporting elements.

FIG. 3B shows a cross section of the monopile fastening system 17 of FIG. 3A comprising two supporting devices 18 each characterized by three wedge supporting elements 20, 24 and 27.

Figure 4:
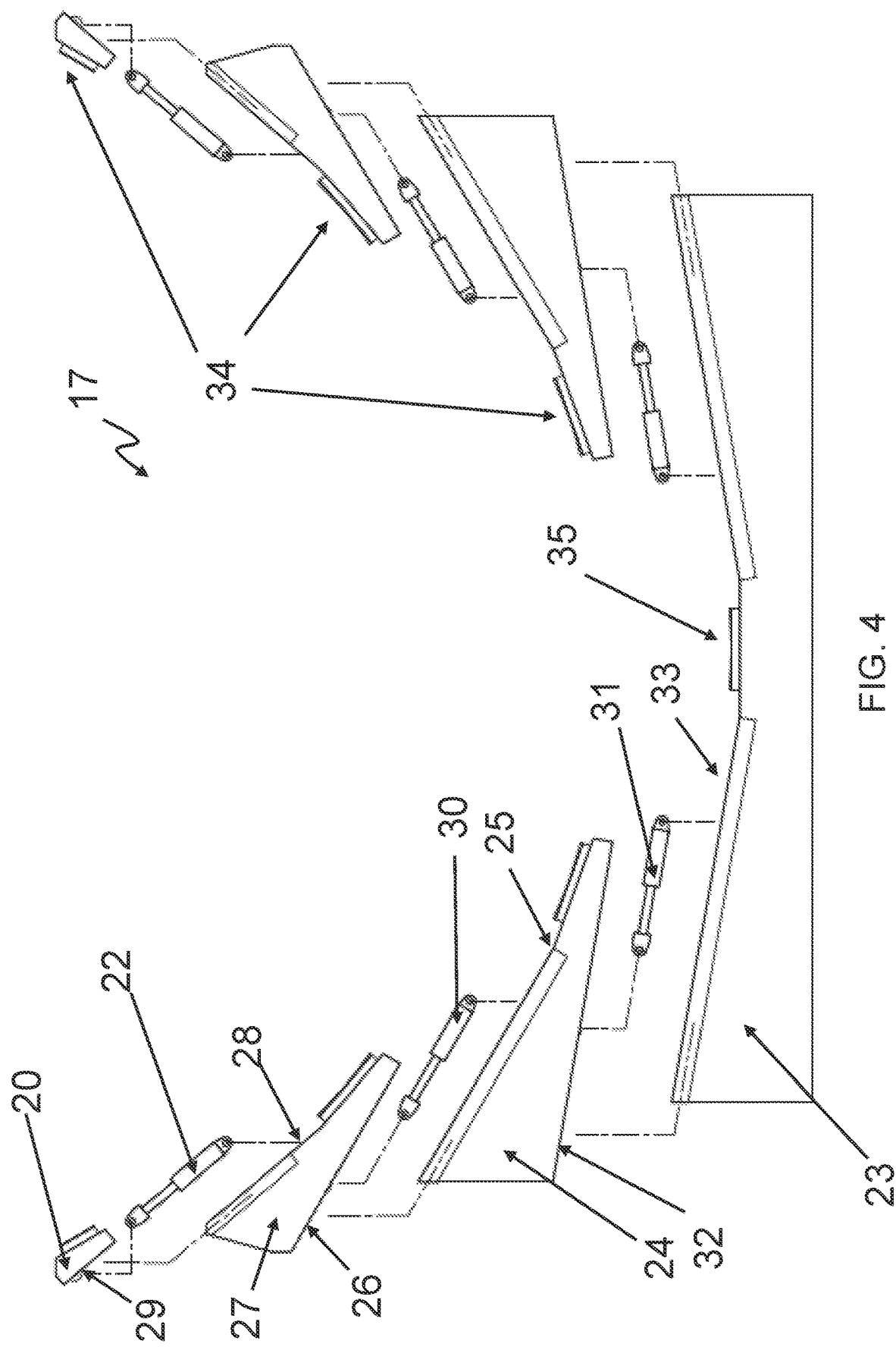
FIG. 4 shows an exploded view of the monopile fastening system of FIGS. 3A and 3B.

FIG. 4 shows an exploded view of the monopile fastening system 17 of FIGS. 3A and 3B.

Each of the two supporting devices 18 comprises two hydraulic jacks 22 and 30 located in recesses on the top surface of wedge supporting elements 24 and 27, thus allowing for displacement between supporting elements 20 and 27 along the contact surfaces 29 and 28 and between supporting elements 24 and 27 along the contact surfaces 25 and 26.

Further hydraulic jacks 31 are located in recesses on the top surface of supporting frame 23. This allows for displacement between the supporting devices 18 and the supporting frame 23 along the contacting surfaces 32 and 33.

FIG. 4 also shows the presence of contact pads 34 and 35 on the surface of the supporting elements and supporting frame.

Figure 5:
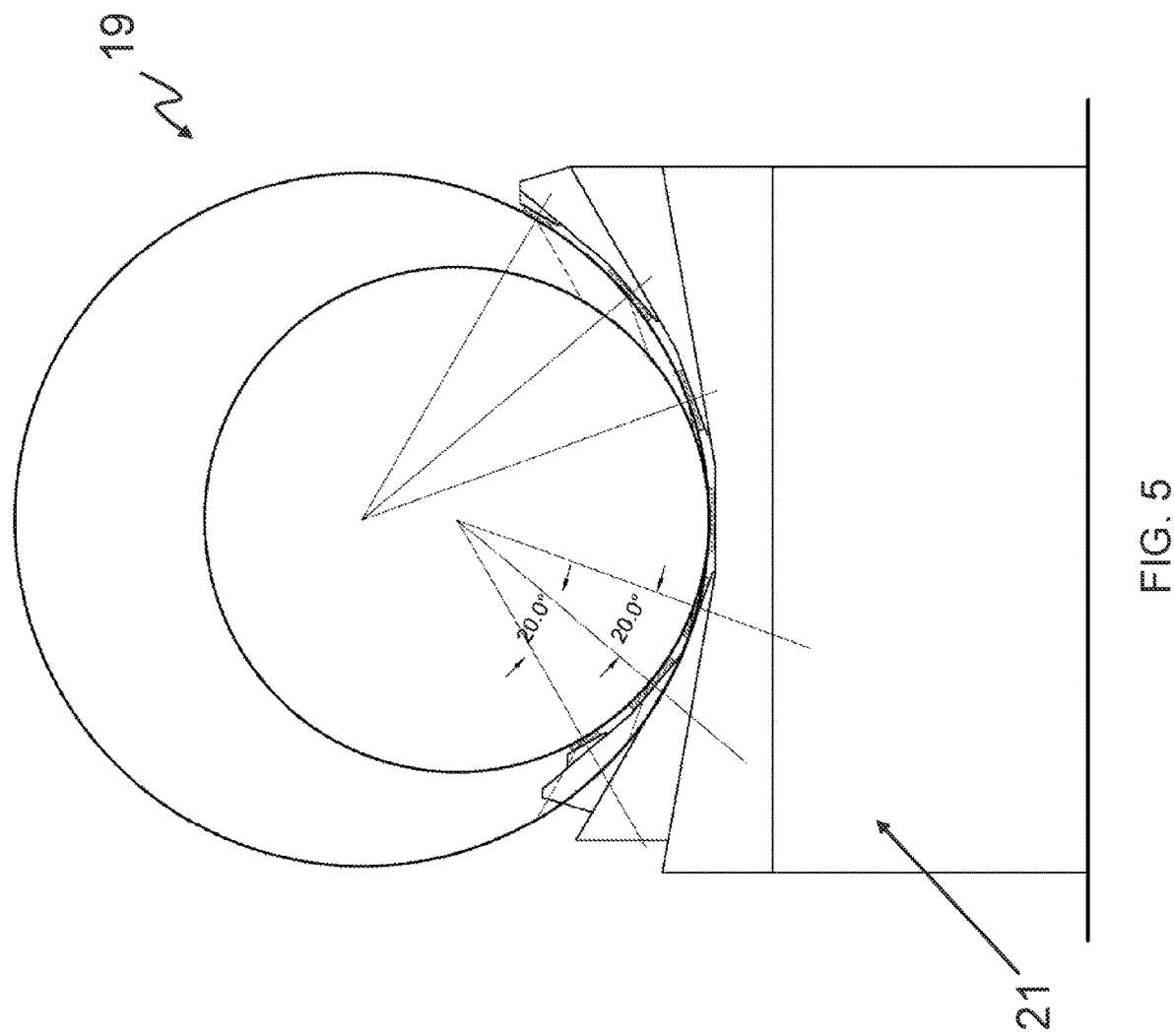
FIG. 5 shows a cross section of a sea transport comprising the monopile fastening system according to some embodiments of the invention.

FIG. 5 shows a cross section 19 of a sea transport 21 comprising the monopile fastening system according to some embodiments of the invention in which the two supporting devices are shown as differently adjusted so as to accommodate monopiles having different section diameter.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is possible and advantageous.

The invention claimed is:

1. A monopile fastening system (1, 9, 17) for retaining one or more elongated monopile during sea transport and/or quay transport, said system comprising:
   at least two supporting devices (3, 11, 18);
   a supporting frame (2, 10, 23) for securing said at least two supporting devices (3, 11, 18) to a surface of a vessel, barge or a sea transport unit, said at least two supporting devices (3, 11, 18) having each at least one surface (6, 32) in contact with a surface (7, 33) of said supporting frame (2, 10, 23);
   wherein each of said at least two supporting devices (3, 11, 18) comprises, at least two supporting elements (4, 5, 12, 13, 20, 24, 27), said at least two supporting elements having each at least one surface (14, 15, 25, 26, 28, 29) in contact with each other;
   wherein said at least two supporting elements (4, 5, 12, 13, 20, 24, 27) are connected with each other through one or more displacing means (16, 22, 30); and wherein said one or more displacing means (16, 22, 30) are means for displacing said at least two supporting elements (4, 5, 12, 13, 20, 24, 27) along said at least one surface (14, 15, 25, 26, 28, 29) in contact with each other; and wherein said at least two supporting devices (3, 11, 18) are connected to said surface (7, 33) of said supporting frame (2, 10, 23) through one or more shifting means (8, 31).

2. A monopile fastening system (1, 9, 17) according to claim 1, wherein said one or more shifting means (8, 31) are means for shifting said at least two supporting devices (3, 11, 18) along said at least one surface (6, 32) in contact with said surface (7, 33) of said supporting frame (2, 10, 23).

3. A monopile fastening system (1, 9, 17) according to claim 2, wherein said at least one surface of said at least two supporting devices (3, 11, 18) in contact with said surface (7, 33) of said supporting frame (2, 10, 23) is the bottom surface (6, 32) of the bottom supporting element (4, 24) of said at least two supporting elements (4, 5, 12, 13, 20, 24, 27).

4. A monopile fastening system (1, 9, 17) according to claim 3, wherein said at least two supporting devices (3, 11, 18) are at least two wedge supporting devices.

5. A monopile fastening system (1, 9, 17) according to claim 4, wherein said at least two supporting elements (4, 5, 12, 13, 20, 24, 27) comprises one or more pads (34).

6. A monopile fastening system (1, 9, 17) according to claim 5, wherein said supporting frame (2, 10, 13) comprises one or more pads (35).

7. A monopile fastening system (1, 9, 17) according to claim 6, wherein said one or more displacing means (16, 22, 30) connecting said at least two supporting elements, are or comprise at least one hydraulic jack.

8. A monopile fastening system (1, 9, 17) according to claim 7, wherein said at least one hydraulic jack is located in a recess of at least two contact surfaces.

9. A monopile fastening system (1, 9, 17) according to claim 8, wherein said one or more shifting means (8, 31) connecting said supporting frame to at least one of said at least two supporting devices are or comprise at least one hydraulic jack.

10. A monopile fastening system (1, 9, 17) according to claim 9, wherein at least one hydraulic jack is located in a recess of said supporting frame.

11. A monopile fastening system (1, 9, 17) according to claim 10, wherein a recess is located on a surface of said supporting frame.

* * * * *